United States Patent
Zhou et al.

(10) Patent No.: US 10,756,969 B2
(45) Date of Patent: Aug. 25, 2020

(54) DISRUPTION MINIMIZATION FOR GUESTS WHEN APPLYING CHANGES TO A DATA PLANE OF A PACKET HANDLER IN A HOST

(71) Applicant: Nicira, Inc., Palo Alto, CA (US)

(72) Inventors: Jingmin Zhou, Los Gatos, CA (US); Subrahmanyam Manuguri, San Jose, CA (US); Anirban Sengupta, Saratoga, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/677,733

(22) Filed: Aug. 15, 2017

(65) Prior Publication Data

US 2019/0058631 A1   Feb. 21, 2019

(51) Int. Cl.
*H04L 12/24*   (2006.01)
*H04L 12/863*   (2013.01)
*H04L 12/801*   (2013.01)

(52) U.S. Cl.
CPC ...... *H04L 41/0816* (2013.01); *H04L 41/0823* (2013.01); *H04L 41/0836* (2013.01); *H04L 47/10* (2013.01); *H04L 47/50* (2013.01)

(58) Field of Classification Search
None
See application file for complete search history.

(56) References Cited

U.S. PATENT DOCUMENTS

| | | | | |
|---|---|---|---|---|
| 6,785,843 B1 * | 8/2004 | McRae | ... | H04L 45/00 714/23 |
| 10,164,829 B1 * | 12/2018 | Watson | ... | G06F 13/385 |
| 2003/0126464 A1 * | 7/2003 | McDaniel | ... | G06F 21/604 726/4 |
| 2003/0210705 A1 * | 11/2003 | Seddigh | ... | H04L 45/10 370/419 |
| 2004/0205101 A1 * | 10/2004 | Radhakrishnan | ... | G06F 9/5016 709/200 |
| 2006/0193266 A1 * | 8/2006 | Siddha | ... | H04L 45/245 370/254 |
| 2009/0003204 A1 * | 1/2009 | Okholm | ... | H04L 47/10 370/230 |
| 2009/0028044 A1 * | 1/2009 | Windisch | ... | H04L 12/1877 370/225 |
| 2009/0083517 A1 * | 3/2009 | Riddle | ... | G06F 9/526 712/30 |
| 2009/0161547 A1 * | 6/2009 | Riddle | ... | G06F 9/526 370/236 |
| 2011/0320617 A1 * | 12/2011 | Annamalaisami | ... | H04L 63/1458 709/228 |

(Continued)

*Primary Examiner* — Edan Orgad
*Assistant Examiner* — Emmanuel K Maglo

(57) ABSTRACT

The technology disclosed herein enables a data plane of a packet handler in a host to be changed while minimizing disruption to the operation of guests that are associated therewith. In a particular embodiment, the method provides, in a control plane of the packet handler, extracting state information about states of the data plane and pausing network traffic to the data plane. After pausing the network traffic to the data plane, the method provides applying changes to components of the data plane. After applying changes to the components of the data plane, the method provides restoring the states to the data plane using the state information and resuming the network traffic to the data plane.

20 Claims, 7 Drawing Sheets

(56) References Cited

U.S. PATENT DOCUMENTS

| | | | |
|---|---|---|---|
| 2016/0057052 A1* | 2/2016 | Zhang ................... | H04L 45/28 |
| | | | 709/239 |
| 2016/0072766 A1* | 3/2016 | Jain ..................... | H04L 61/2567 |
| | | | 709/228 |

* cited by examiner

DISRUPTION MINIMIZATION FOR GUESTS WHEN APPLYING CHANGES TO A DATA PLANE OF A PACKET HANDLER IN A HOST

TECHNICAL BACKGROUND

Many network and computing functions can now be virtualized within a host that is hosting one or more guests. The virtualization of these functions allows for greater flexibility and, in many cases, cost savings when compared to implementing the functions using dedicated physical devices and/or systems. For example, network firewall functionality may be implemented as a packet handler executing within a host to protect guests executing thereon rather than relying on a physical network firewall system connected to the physical network through which the host communicates. Other packet handling functions may also be implemented in the host, such as logical network routing functions, quality of service functions, deep packet inspection functions, or any other type of function that may operate on network packet traffic exchanged with a guest.

When the time comes to apply changes to the data plane of a packing handler in a host (e.g., to update or otherwise modify the data plane), the change process can cause significant disruption to any guests on the host. For example, to apply changes to the data plane of the handler, the associated guests may need to be evacuated from the host, may need to be shut down before the changes are applied and restarted after, and the host itself may need to be restarted. Any of the aforementioned steps may render the guests unusable on the host for a relatively long period of time. Accordingly, changes to the data plane may need to be timed appropriately to minimize the effect the disruption has on the applications or services provided by the guests executing on the host.

SUMMARY

The technology disclosed herein enables a data plane of a packet handler in a host to be changed while minimizing disruption to the operation of guests that are associated therewith. In a particular embodiment, the method provides, in a control plane of the packet handler, extracting state information about states of the data plane and pausing network traffic to the data plane. After pausing the network traffic to the data plane, the method provides applying changes to components of the data plane. After applying changes to the components of the data plane, the method provides restoring the states to the data plane using the state information and resuming the network traffic to the data plane.

In some embodiments, before applying changes to the components of the data plane, the method provides resetting resources that hold references to the data plane and, after applying changes to the components of the data plane, restoring the resources to the data plane. In those embodiments, resetting the resources may include resetting a reference count for each of one or more virtual network interfaces of guests in communication with the data plane. Likewise, resetting the reference count may include destroying one or more data structures that maintain the reference count for each of the virtual network interfaces and restoring the resources to the data plane may include allowing the data structures to be rebuilt for the virtual network interfaces.

In some embodiments, extracting the state information may include requesting the state information through a command written to a device file and receiving the state information through the device file.

In some embodiments, restoring the states to the data plane using the state information may include restoring the states in a format used by the data plane prior to applying changes to the components of the data plane and, in the data plane, converting the states to a format used by the data plane subsequent to applying changes to the components of the data plane. In those embodiments, applying changes to the components of the data plane may include providing the data plane with format conversion information for use when converting the states.

In some embodiments, pausing the network traffic to the data plane includes buffering the network traffic in the host until resuming the network traffic to the data plane.

In some embodiments, the packet handler comprises a distributed firewall and, in those embodiments, the states may include connections through the distributed firewall.

In another embodiment, a system is provided having one or more computer readable storage media and a processing system operatively coupled with the one or more computer readable storage media. Program instructions stored on the one or more computer readable storage media, when read and executed by the processing system, direct the processing system to extract, from a data plane of a packet handler in a host to a control plane of the packet handler, state information about states of the data plane and pause network traffic to the data plane. After pausing the network traffic to the data plane, the program instructions direct the processing system to change components of the data plane. After applying changes to the components of the data plane, the program instructions direct the processing system to restore the states to the data plane using the state information and resuming the network traffic to the data plane.

DETAILED DESCRIPTION

The implementations described herein provide the ability to apply changes to a data plane of a packet handler executing in a host without appreciably disrupting the guests executing on the host. Specifically, a typical packet handler includes the data plane component and a control plane component. The data plane component operates on network packet traffic into and out of one or more guests executing on the host. A guest may be a guest operating system executing within a virtual machine, a containerized application, such as one implemented with Docker® technology available from Docker, Inc., or some other form of virtualizing a computing element on a host. If the data plane is not operational, then communications exchanged by the guests will be disrupted and will likely prevent the guests from operating as intended. Moreover, the guests may need to be shut down, or evacuated to another host if they are to continue functioning, during the application of changes to the data plane, which adds additional disruption to the guests' operation during the change process. In contrast, changes are applied to the data planes herein without shutting down or evacuating their corresponding guests, which minimizes the amount of time that the guests cannot exchange communications and, consequently, cannot function properly.

Figure 1:
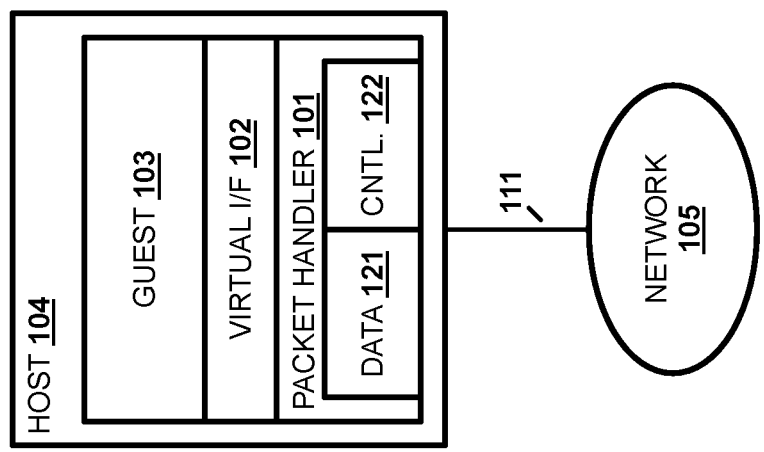
FIG. 1 illustrates an implementation for applying changes to a data plane of a packet handler while minimizing disruption to guests.

FIG. 1 illustrates implementation 100 for applying changes to a packet handler while minimizing disruption to guests. Implementation 100 includes packet handler 101, virtualized network interface 102, guest 103, host 104, and network 105. Packet handler 101 includes data plane 121 and control plane 122. Host 104 communicates over communication link 111 through network 105. Host 104 in this example includes hardware (e.g., microprocessor(s), memory, storage, physical network interface(s), etc.) and software (e.g., hypervisor) necessary to provide a virtualized computing system (e.g., virtual machine) on which guest 103 execute. Network 105 comprises a physical computer network and may include switches, routers, firewalls, or any other type of networking equipment—including combinations thereof.

In operation, data plane 121 of packet handler 101 operates on network traffic exchanged with guest 103. The network traffic may be exchanged over network 105 or may be exchanged with other guests, if any, on host 104. Data plane 121 may perform a network firewall function, or some other network security function, on the network traffic, may perform a quality of service function, or any other type of function that operates on network traffic. Control plane 122 controls how data plane 121 operates and control plane 122 may itself be controlled by a management plane for a virtual environment of which packet handler 101, virtualized network interface 102, and guest 103 are a part. For example, if packet handler 101 implements a network firewall, then control plane 122 may provide data plane 121 with rules that data plane 121 uses when determining whether to allow or deny network traffic exchanged with virtualized network interface 102 of guest 103. Additionally, as discussed further below, control plane 122 is charged with applying changes to data plane 121 when changes are available (e.g., when a new version of data plane 121 is provided to control plane 122 for install from the above mentioned management plane). Control plane 122 in this example is able to minimize disruption to guest 103 when applying changes to data plane 121 by allowing the guest 103 to remain executing while changes are applied to data plane 121.

Figure 2:
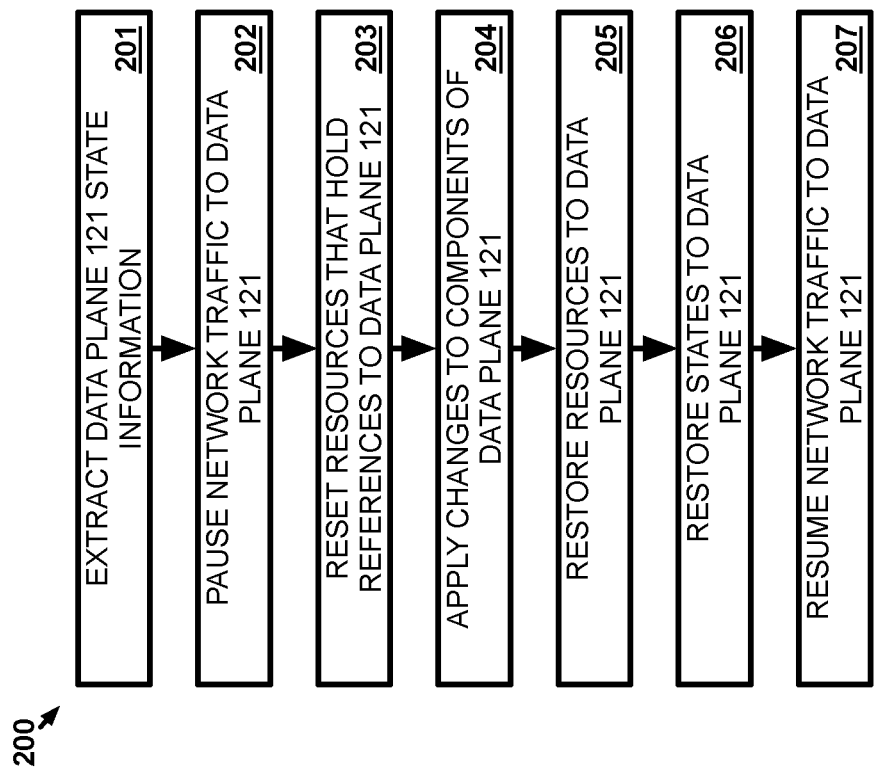
FIG. 2 illustrates a scenario for the implementation to apply changes to a data plane of a packet handler while minimizing disruption to guests.

FIG. 2 illustrates scenario 200 for implementation 100 to apply changes to a data plane of a packet handler while minimizing disruption to guests. In scenario 200, when control plane 122 is ready to apply changes to data plane 121, control plane 122 extracts state information about states of data plane 121 (201). The state information may include network connection identifiers, such as network addresses of connections currently relevant to the operation of data plane 121. For instance, if packet handler 101 is a network firewall, then the state information may indicate firewall rules and network connections that are currently allowed by data plane 121. In other examples, the state information may include any information that is pertinent to the state of data plane 121 at the time step 201 is performed and is necessary for data plane 121 to continue operating in the same state once changes to data plane 121 have been applied. Control plane 122 may have direct access to a memory location where data plane 121 stores state information in order to extract the state information, control plane 122 may request the state information from data plane 121 (e.g., through a device file), or control plane 122 may obtain the state information from data plane 121 in some other manner. Control plane 122 stores the state information in a location accessible by control plane 122 for use after changes have been applied to data plane 121.

Control plane 122 further pauses network traffic to data plane 121 (202). The pause in network traffic prevents network traffic from reaching data plane 121 during the change application process when the network traffic cannot be handled by data plane 121. Likewise, pausing the network traffic prevents data plane 121 from performing any operation that may change the state of data plane 121 after the state information was extracted in step 201. The network traffic may be paused by control plane 122 instructing host 104 to buffer the network traffic to data plane 121 (either destined for virtualized network interface 102 or coming from virtualized network interface 102) within host 104 until data plane 121 becomes operational again after the application of changes. In some examples, pausing the network traffic may occur at the outset of scenario 200.

After pausing the network traffic to data plane 121, control plane 122 resets resources that hold references to data plane 21 (204). The resources that hold references to data plane 121 include any virtualized network interfaces, including virtualized network interface 102, that communicate through data plane 121. Data plane 121 may track the resources associated therewith using a data structure, or data object, created for each respective resource. Each resource's references to the data plane 121 may be tracked in that resources data structure. Resetting the data structures ensures no resources are currently referencing data plane 121 when data plane 121 is unloaded for application of changes. The data structures may further include at least a portion of the state information extracted above.

After extracting the state information, pausing the network traffic, and resetting the resources, if necessary, control plane 122 apply changes to components data plane 121 (204). Control plane 122 may execute an install script to apply changes to the components of data plane 121, may replace the executable code of each component being changed so the replacement code can simply be executed in place of the previous code, or may provide changed software components to data plane 121 in some other manner. Regardless of the mechanism used to change the components of data plane 121, after applying changes to the components of data plane 121, control plane 122 restores the resources to data plane 121 (205). Data plane 121 may automatically re-create the data structures for each virtualized interface that references data plane 121 or control plane 122 may instruct data plane 121 to recreate the data structures, which may be performed in conjunction with the state restoration step below.

Control plane 122 restores the states to data plane 121 using the state information extracted above (206). In some cases, the format of the state information used by data plane 121 after application of changes may be different than the format used by data plane 121 before the changes were applied. In those cases, the changes applied to data plane 121 may include the information necessary for data plane 121 to convert the state information itself and control plane 122 would, therefore, provide the state information in the originally extracted format to data plane 121. As noted above, the data structures of data plane 121 may include at least a portion of the state information. Therefore, control plane 122 may provide the needed state information to repopulate the state information in the data structures.

Once the states have been restored to data plane 121, control plane 122 resumes the network traffic to data plane 121 (207). Any network traffic that was buffered by host 104 is now allowed to reach data plane 121 along with any other subsequent traffic directed to data plane 121. Since the state information has been restored, data plane 121 will operate based on that state information just as data plane 121 did before the changes were applied. The steps of scenario 200 should be performed in an amount of time small enough such that a user would be unlikely to notice the disruption in the operation of guest 103 due to the changes being applied to data plane 121. For instance, if guest 103 provides a portion of a web application to a user's browser, a delay of a second or two caused by applying changes to data plane 121 should not appreciably affect the user's experience when using the web application.

Figure 3:
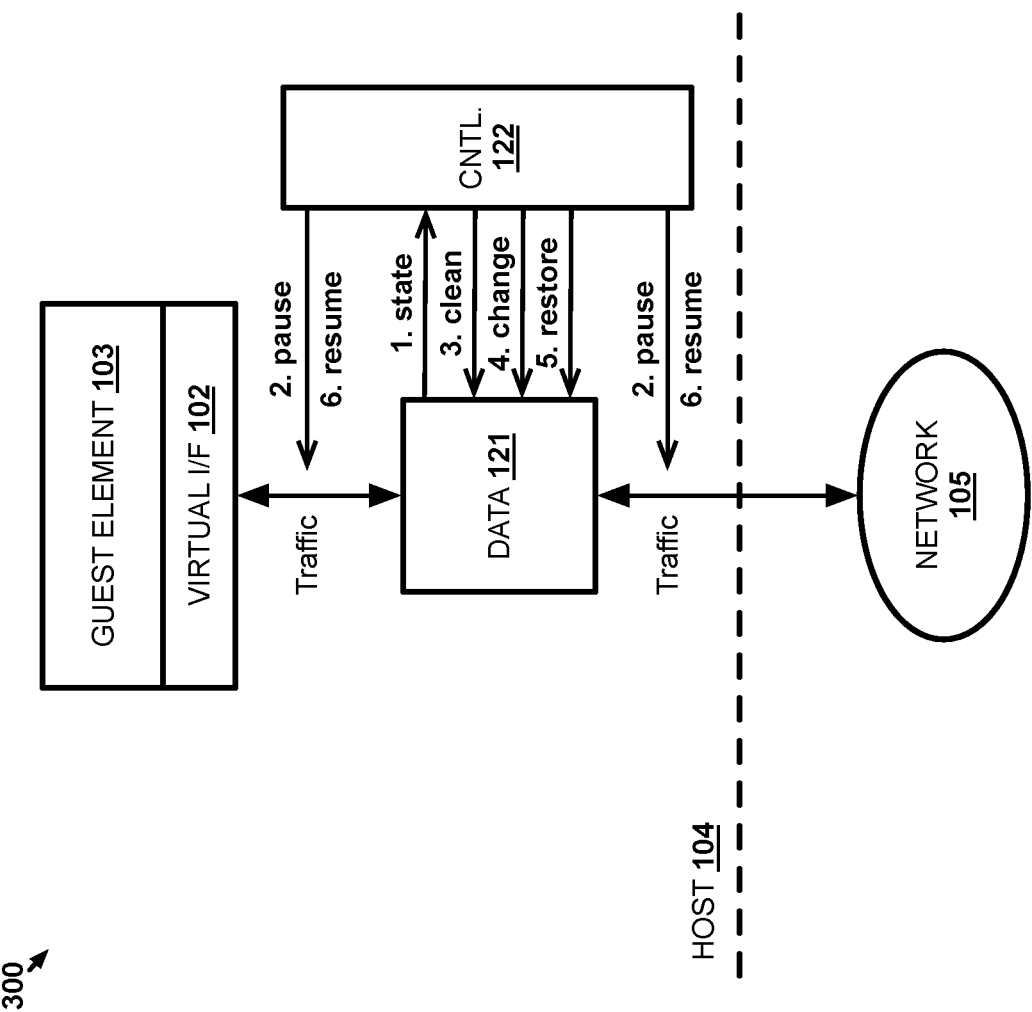
FIG. 3 illustrates another scenario for the implementation to apply changes to a data plane of a packet handler while minimizing disruption to guests.

FIG. 3 illustrates scenario 300 for implementation 100 to apply changes to a data plane of a packet handler while minimizing disruption to guests. Scenario 300 provides a visualization as to how elements of implementation 100 may interact when performing steps akin to those described for scenario 200. In particular, scenario 300 shows data traffic being passed between data plane 121 and network 105 as well as data traffic being passed between data plane 121 and virtualized network interface 102. As such, all data traffic exchanged between virtualized network interface 102 and network 105 must pass through data plane 121. In other examples, data traffic may also be exchanged with other guests on host 104 rather than with network 105.

Scenario 300 provides that control plane 122 extracts the state information of data plane 121 at step 1 so that the state of data plane 121 can be restored after applying changes to data plane 121. Control plane 122 pauses the network traffic to data plane 121 at step 2 from virtualized network interface 102 and network 105, or from any other source. Control plane 122 then instructs data plane 121 to clean up the resources at step 3 that are currently associated with data plane 121, which is only virtualized network interface 102 in this example. Once the resources are cleaned and data plane 121 no longer has any references thereto from virtualized network interface 102, control plane 122 applies the changes at step 4 to one or more components of 121. Following the application of changes, control plane 122 restores data plane 121 at step 5 to the state data plane 121 was in prior to the changes being applied using the state information extracted at step 1. Furthermore, the restoration allows data plane 121 to restore the resources and their references to data plane 121 since data plane 121 is back to being operational. Upon completion of the restore process, control plane 122 allows traffic to resume being exchanged with data plane 121 at step 6.

Figure 4:
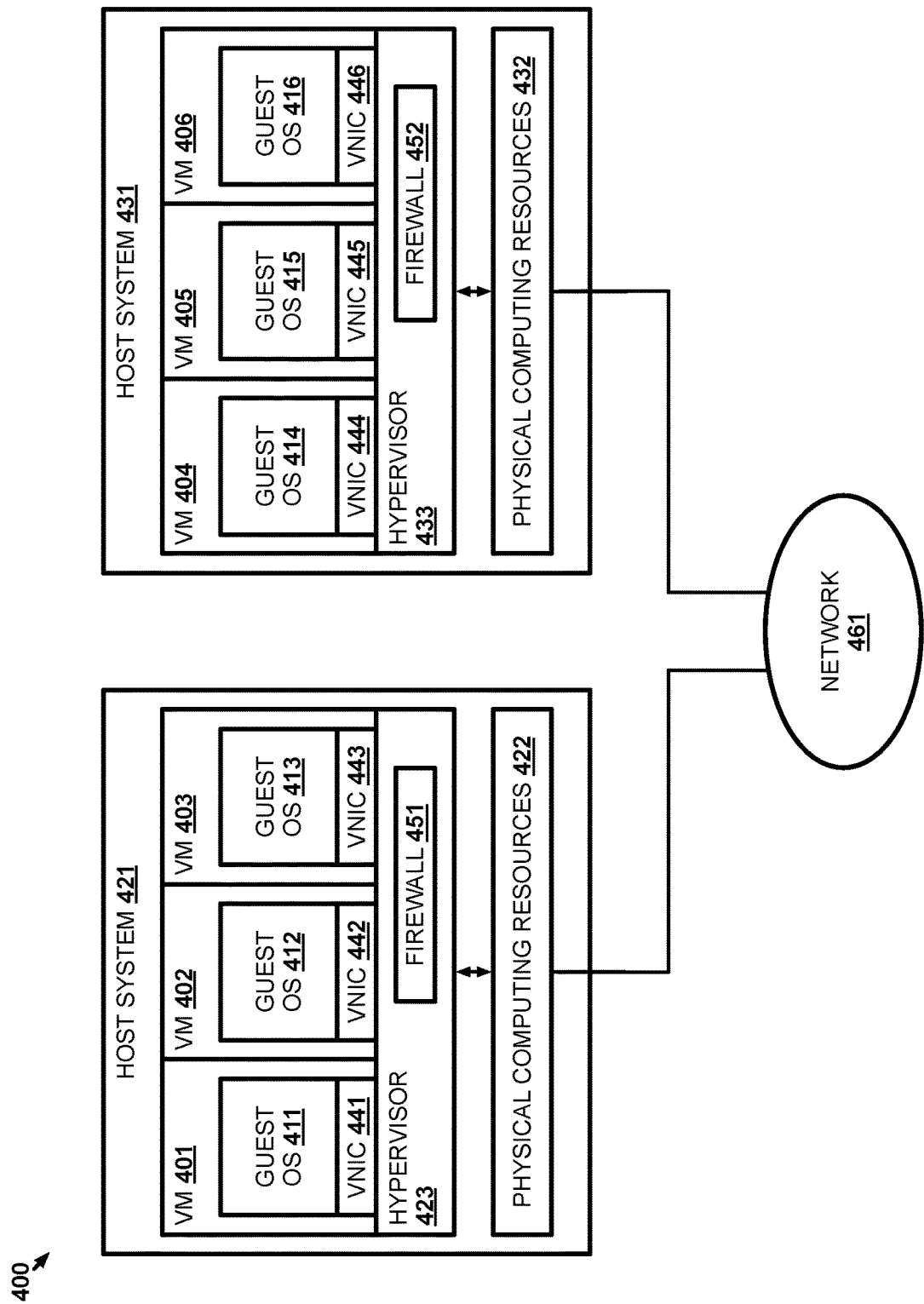
FIG. 4 illustrates another implementation for applying changes to a data plane of a packet handler while minimizing disruption to guests.

FIG. 4 illustrates implementation 400 for applying changes to a data plane of a packet handler while minimizing disruption to guests. Implementation 400 includes host computing system 421, host computing system 431, and network 461. Network 461 may include the Internet, one or more local area networks, one or more wide area networks, and/or one or more other types of networks between computing systems.

In this example, host computing system 421 executes hypervisor 423 to allocate physical computing resources 422 among virtual machines 401-403. Likewise, host computing system 431 executes hypervisor 433 to allocate physical computing resources 432 among virtual machines 404-406. Physical computing resources 422 and 432 may include processing resources (e.g., processing circuitry, CPU time/cores, etc.), memory space (e.g., random access memory, hard disk drive(s), flash memory, etc.), network interfaces, user interfaces, or any other type of resource that a physical computing system may include. Hypervisor 423 and hypervisor 433 include distributed firewall instance 451 and distributed firewall instance 452, respectively. Distributed firewall instance 451 and distributed firewall instance 452 are packet handlers that virtualize the functions of a physical network firewall system for virtual machines provided by hypervisor 423 and hypervisor 433, respectively. Collectively, distributed firewall instance 451 and distributed firewall instance 452 may be referred to as a distributed firewall since firewall functions are distributed between multiple hosts. Additionally, hypervisor 423 provides one of VNICs 441-443 to each respective virtual machine 401-403 and hypervisor 433 provides one of VNICs 444-446 to each respective virtual machine 404-406. Guest operating systems (OSs) 411-416 executing within virtual machines 401-406 use the respective VNICs 441-446 to exchange network communications.

It should be understood that the distribution of virtual machines evenly across two host computing systems, as shown in FIG. 4, is merely exemplary. The six virtual machines shown may instead be implemented on any number of host computing systems. Likewise, host computing systems 421 and 431 could host additional hosts (e.g., hypervisors) and virtual machines and/or other virtual elements that are not involved in this example.

Figure 5:
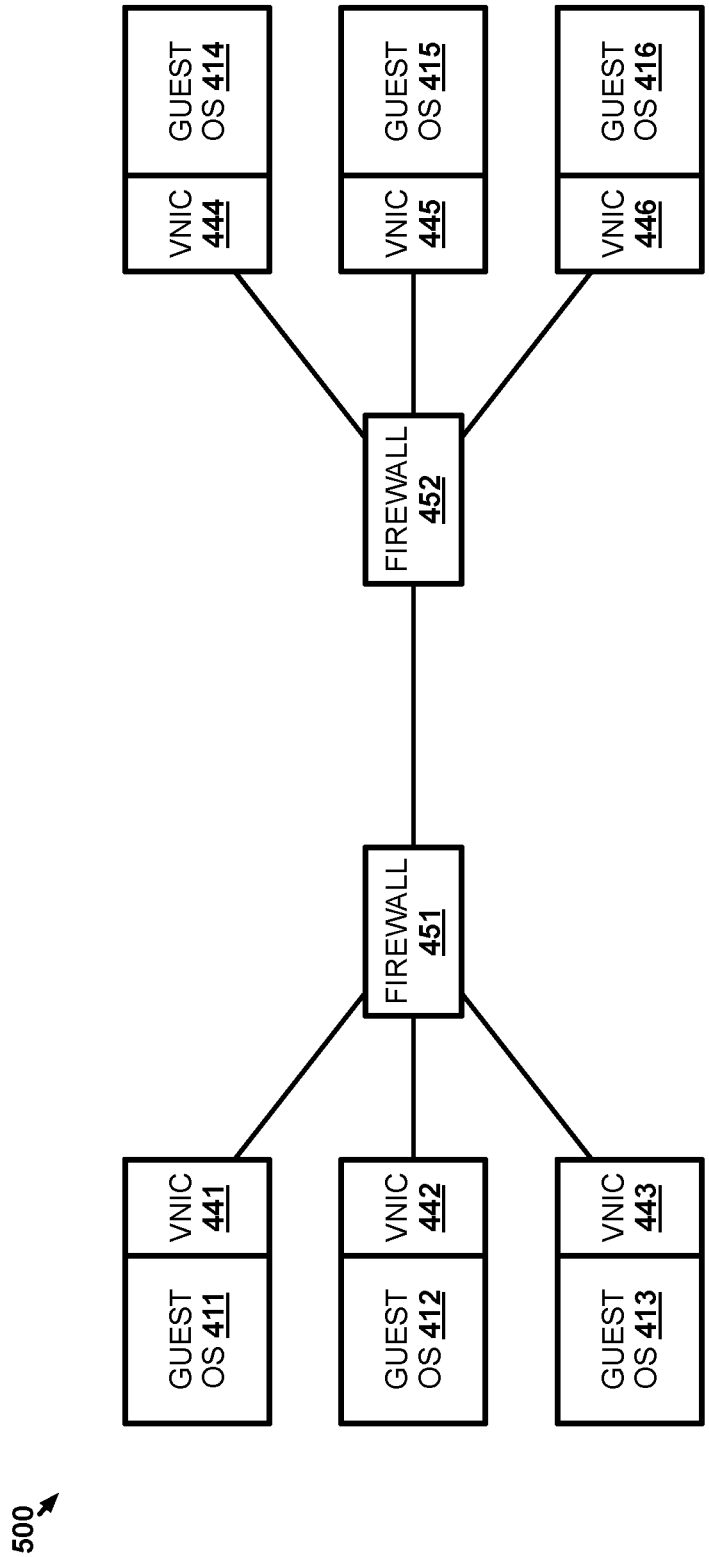
FIG. 5 illustrates a logical arrangement of the other implementation for applying changes to a data plane of a packet handler while minimizing disruption to guests.

FIG. 5 illustrates logical arrangement 500 of implementation 400 for applying changes to a data plane of a packet handler while minimizing disruption to guests. Logical arrangement 500 shows paths by which packet communications from each of guest OSs 411-413 are routed to guest OSs 414-416 and in the reverse direction. Packets pass from a guest OS to a VNIC and then through a distributed firewall instance before being routed to a destination. For example, packets from guest OS 411 are passed to VNIC 441 and then to distributed firewall instance 451. From distributed firewall instance 451 the packets may be passed to VNIC 442 or VNIC 443, if guest OS 412 or guest OS 413 is the packets' destination, or may be passed to distributed firewall instance 452 for distribution to one of VNICs 444-446 if guest OS 414, guest OS 415, or guest OS 416 is the packet's destination. While not shown, a virtual switch may be implemented by hypervisors 423 and 433 between their respective VNICs and distributed firewall instances. Additionally, the present example includes one distributed firewall instance per hypervisor, although other examples may include additional instances. For example, a distinct distributed firewall instance may be executed for each respective VNIC.

Figure 6:
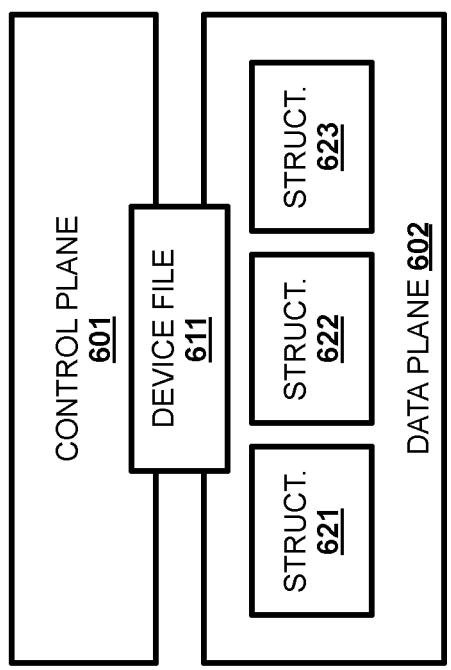
FIG. 6 illustrates a packet handler in the implementation for applying changes to a data plane of a packet handler while minimizing disruption to guests.

FIG. 6 illustrates distributed firewall instance 600 in implementation 400 for applying changes to a data plane of a packet handler while minimizing disruption to guests. Distributed firewall instance 600 is an example of how distributed firewall instance 451 is implemented herein, although other examples may use different implementations. Distributed firewall instance 452 may be implemented in a similar manner. Distributed firewall instance 600 includes control plane 601 and data plane 602. Control plane 601 logically exists in user space while data plane 602 logically exists in kernel space. To communicate between the two spaces, device file 611 exists to pass information back and forth. Information written to device file 611 by one of control plane 601 or data plane 602 can be read by the other. Other manners of passing information between user space and kernel space may be used in other examples. Data plane 602 created data structure 621, data structure 622, and data structure 623, for tracking references to data plane 602 by respective VNICs 441-443 and include state information for the performance of firewall functions on their respective VNICs 441-443.

Figure 7:
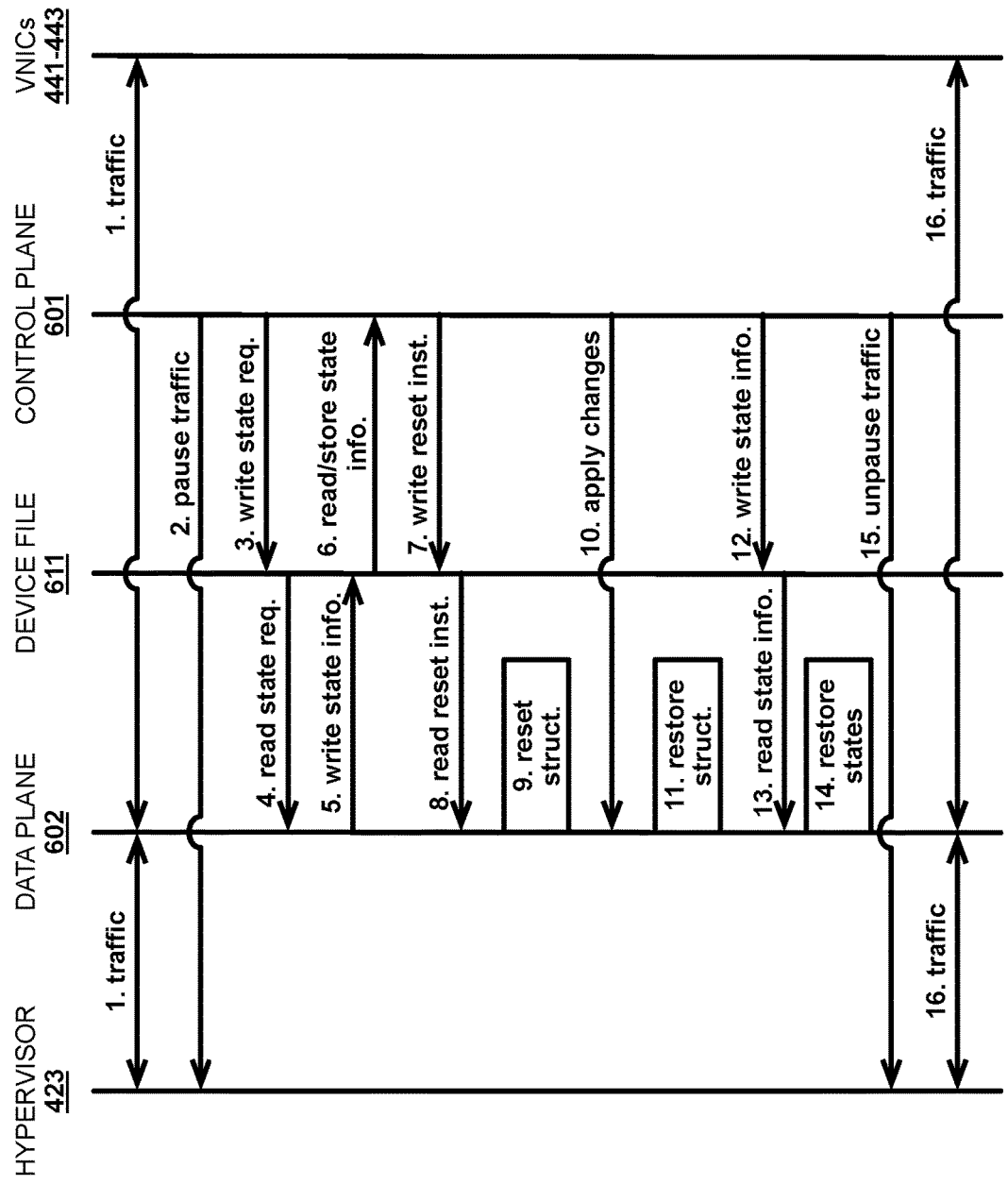
FIG. 7 illustrates a scenario for the other implementation to apply changes to a data plane of a packet handler while minimizing disruption to guests.

FIG. 7 illustrates scenario 700 for implementation 400 to apply changes to a data plane of a packet handler while minimizing disruption to guests. Scenario 700 begins with data plane 602 operating normally at step 1 by performing firewall functions on traffic transferred between VNICs 441-443 and hypervisor 423, which handles the exchange of traffic outside of host computing system 421 (e.g., to network 461) using physical computing resources 422. Data plane 602 uses state information stored within data structure 621, data structure 622, and data structure 623 to perform its firewall functions. For example, the state information may include firewall rules, connection identification information for connections with the respective VNICs 441-443, or some other type of information upon which a firewall's operation may depend. The state information may, at least in part, be created as part of data plane 602's operation. For example, upon determining that a particular incoming network connection satisfies the rules for being allowed to communicate with VNIC 442, data plane 602 may store state information that identifies that connection in data structure 622 as an allowed connection so that data plane 602 can allow subsequent network traffic for the connection without having to apply the rules again.

When the time comes for control plane 601 to apply changes to data plane 602, control plane 601 instructs a network module of the host at step 2 to pause network traffic from entering data plane 602. The changes may include updates to components of data plane 602 and may be received by control plane 601 from a management plane for the virtual environment in which distributed firewall instance 451 is a part, although the changes may be obtained by control plane 601 in some other manner. Data plane 602 is allowed to complete the processing, and subsequent transfer if allowed, of any network traffic already received by data plane 602 before the network traffic pause occurs. After the network traffic is paused, control plane 601 writes an instruction to device file 611 at step 3 that requests the state information from data plane 602. Data plane 602 reads the command at step 4 and, responsively, writes the state information to device file 611 at step 5 from which control plane 601 reads that state information at step 6 and stores it in a location where the state information can be later accessed when data plane 602's state will be restored. Control plane 601 then writes an instruction to device file 611 at step 7 that instructs data plane 602 to reset the references by deleting data structure 621, data structure 622, and data structure 623, which subsequently releases references to data plane 602. This allows changes to be applied to data plane 602 safely. Data plane 602 reads the instruction at step 8 and deletes data structure 621, data structure 622, and data structure 623 accordingly at step 9. Though not shown, data plane 602 may then provide control plane 601 with a confirmation, via device file 611, that the resources have been reset before data plane 602 proceeds with the application of changes.

Control plane 601 then performs the procedure at step 10 that applies changes to the components of data plane 602 that are subject to being changed. In some cases, all components of data plane 602 may be replaced with replacement components while, in other cases, less than all components of data plane 602 may be changed. After the changes are applied, data plane 602 becomes operational again and may automatically restore data structure 621, data structure 622, and data structure 623 (e.g., recreate the data structures if they were deleted) at step 11 to maintain resource reference and state information. Control plane 601 then writes the previously stored state information to device file 611 at step 12 with an instruction to restore the state information to data structure 621, data structure 622, and data structure 623. Data plane 602 reads the restoration instruction and the state information at step 13 and, responsively, restores the appropriate state information at step 14 to data structure 621, data structure 622, and data structure 623, respectively. In some examples, the changed components of data plane 602 may require the state information (or the data structures themselves) to be reformatted from the format the state information was in prior to the changes being applied. The changed components will include the instructions necessary to perform the reformatting of the state information. Though not shown, data plane 602 may provide control plane 601 with a confirmation, via device file 611, that the state information has been restored.

Once the state information has been restored, data plane 602 is ready to return to normal operation. Therefore, control plane 601 instructs network module of hypervisor 423 at step 15 to resume the network traffic being routed through data plane 602. Upon receiving the network traffic, data plane 602 processes the received network traffic at step 16 using the changed components and the same state information that data plane 602 was using prior to being changed. Advantageously, in scenario 700, virtual machine 401, virtual machine 402, and virtual machine 403, do not need to be shut down or moved to another host in order for changes to be applied to data plane 602, which minimizes the disruption to the functions being performed in guest OS 411, guest OS 412, and guest OS 413.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of applying changes to a data plane component of a packet handler within a hypervisor executed by a host computing system to host one or more virtual machines, without disrupting operation of the one or more virtual machines, wherein the packet handler comprises a control plane component and the data plane component through which network traffic exchanged with the one or more virtual machines pass, the method comprising:
   in the hypervisor, receiving the network traffic;
   in the control plane component, extracting state information about states of the data plane component;
   pausing the network traffic to the data plane component from the hypervisor, wherein pausing the network traffic includes buffering the network traffic in the hypervisor to prevent the network traffic from reaching the data plane component until the network traffic is resumed;

after pausing the network traffic to the data plane component, updating one or more versions of one or more components of the data plane component; and after applying the changes to the components of the data plane component, restoring the states to the data plane component using the state information and resuming the network traffic to the data plane component from the hypervisor.

2. The method of claim 1, further comprising:

before updating the one or more versions, resetting resources that hold references to the data plane component; and after updating the one or more versions, restoring the resources to the data plane component.

3. The method of claim 2, wherein resetting the resources comprises:

resetting a reference count for each of one or more virtual network interfaces in communication with the data plane component.

4. The method of claim 3, wherein;

resetting the reference count comprises destroying one or more data structures that maintain the reference count for each of the virtual network interfaces; and restoring the resources to the data plane component includes allowing the data structures to be rebuilt by the virtual network interfaces.

5. The method of claim 1, wherein extracting the state information comprises:

requesting the state information through a command written to a device file; and receiving the state information through the device file.

6. The method of claim 1, wherein restoring the states to the data plane component using the state information comprises:

restoring the states in a format used by the data plane component prior to updating the one or more versions; and in the data plane component, converting the states to a format used by the data plane component subsequent to updating the one or more versions.

7. The method of claim 6, further comprising:

after pausing the network traffic to the data plane component, providing the data plane component with format conversion information for use when converting the states.

8. The method of claim 1, wherein pausing the network traffic occurs before extracting the state information.

9. The method of claim 1, wherein the packet handler comprises a distributed firewall.

10. The method of claim 9, wherein the states comprise connections through the distributed firewall.

11. A system for applying changes to a data plane component of a packet handler within a hypervisor executed by a host computing system to host one or more virtual machines, without disrupting operation of the one or more virtual machines, wherein the packet handler comprises a control plane component and a data plane component through which network traffic exchanged with the one or more virtual machines pass, the system comprising:

one or more computer readable storage media;

a processing system operatively coupled with the one or more computer readable storage media; and program instructions stored on the one or more computer readable storage media that, when read and executed by the processing system, direct the processing system to:

receive the network traffic in the hypervisor;

extract, from the data plane component to the control plane component, state information about states of the data plane component;

pause the network traffic to the data plane component from the hypervisor, wherein pausing the network traffic includes buffering the network traffic in the hypervisor to prevent the network traffic from reaching the data plane component until the network traffic is resumed;

after pausing the network traffic to the data plane component, update one or more versions of one or more components of the data plane component; and after applying the changes to the components of the data plane component, restore the states to the data plane component using the state information and resuming the network traffic to the data plane component from the hypervisor.

12. The system of claim 11, wherein the program instructions further direct the processing system to:

before updating the one or more versions, reset resources that hold references to the data plane component; and after updating the one or more versions, restore the resources to the data plane component.

13. The system of claim 12, wherein to reset the resources, the program instructions direct the processing system to:

reset a reference count for each of one or more virtual network interfaces in communication with the data plane component.

14. The system of claim 13, wherein:

to reset the reference count, the program instructions direct the processing system to destroy one or more data structures that maintain the reference count for each of the virtual network interfaces; and to restore the resources to the data plane component, the program instructions direct the processing system to allow the data structures to be rebuilt by the virtual network interfaces.

15. The system of claim 11, wherein to extract the state information, the program instructions direct the processing system to:

request the state information through a command written to a device file; and receive the state information through the device file.

16. The system of claim 11, wherein to restore the states to the data plane component using the state information, the program instructions direct the processing system to:

restore the states in a format used by the data plane component prior to updating the one or more versions; and in the data plane, convert the states to a format used by the data plane component subsequent to updating the one or more versions.

17. The system of claim 16, wherein the program instructions further direct the processing system to:

after pausing the network traffic to the data plane component, provide the data plane component with format conversion information for use when converting the states.

18. The system of claim 11, wherein the program instructions direct the processing system to:

pause the network traffic before extracting the state information.

19. The system of claim 11, wherein the packet handler comprises a distributed firewall.

20. The system of claim 19, wherein the states comprise connections through the distributed firewall.

\* \* \* \* \*